United States Patent
Su et al.

(10) Patent No.: US 10,015,740 B2
(45) Date of Patent: Jul. 3, 2018

(54) VOICE AND DATA CONTINUITY BETWEEN WIRELESS DEVICES

(71) Applicant: Apple Inc., Cupertino, CA (US)

(72) Inventors: Li Su, San Jose, CA (US); Tahir Shamim, San Jose, CA (US); Jianxiong Shi, Pleasanton, CA (US); Wanping Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/275,292

(22) Filed: Sep. 23, 2016

(65) Prior Publication Data

US 2017/0094597 A1    Mar. 30, 2017

Related U.S. Application Data

(60) Provisional application No. 62/235,512, filed on Sep. 30, 2015.

(51) Int. Cl.
*H04W 48/16* (2009.01)
*H04W 52/02* (2009.01)
(Continued)

(52) U.S. Cl.
CPC ....... *H04W 52/0209* (2013.01); *H04L 9/0861* (2013.01); *H04L 9/14* (2013.01);
(Continued)

(58) Field of Classification Search
CPC .......... H04W 52/0209; H04W 76/023; H04W 76/025; H04W 52/383; H04W 48/16;
(Continued)

(56) References Cited

U.S. PATENT DOCUMENTS 8,666,368 B2    3/2014    Schell et al.
2006/0063564 A1    3/2006    Sharma
(Continued)

FOREIGN PATENT DOCUMENTS

WO    2012088470 A1    6/2012
WO    2015003153 A1    1/2015
(Continued)

OTHER PUBLICATIONS

International Patent Application No. PCT/US2016I053532—International Search Report and Written Opinion dated Jan. 26, 2016.
(Continued)

*Primary Examiner* — Thanh Le
(74) *Attorney, Agent, or Firm* — Dickinson Wright RLLP

(57) ABSTRACT

An accessory wireless device partakes in a data session with a remote device. The data session may be a voice call or other service. To preserve the battery power of the accessory wireless device, the accessory wireless device opportunistically offloads medium-to-long range radio transmission and reception tasks to the companion wireless device while maintaining call continuity. The accessory wireless device and the companion wireless device communicate through a local connection. In one embodiment, the accessory wireless device pushes a wireless wide area network (WWAN) connection to the companion device by sharing selected security and network information with the companion wireless device. When the accessory device and/or the companion device determine that the local connection may not be sustainable, the accessory device pulls the WWAN connection of the companion device back to itself.

20 Claims, 14 Drawing Sheets

(51) Int. Cl.
| | |
|---|---|
| *H04W 76/04* | (2009.01) |
| *H04W 76/02* | (2009.01) |
| *H04W 12/04* | (2009.01) |
| *H04W 12/02* | (2009.01) |
| *H04L 9/08* | (2006.01) |
| *H04L 9/14* | (2006.01) |
| *H04W 76/25* | (2018.01) |
| *H04W 76/15* | (2018.01) |
| *H04W 84/12* | (2009.01) |
| *H04L 29/06* | (2006.01) |

(52) U.S. Cl.
CPC .......... *H04W 12/02* (2013.01); *H04W 12/04* (2013.01); *H04W 48/16* (2013.01); *H04W 76/025* (2013.01); *H04W 76/045* (2013.01); *H04W 76/15* (2018.02); *H04W 76/25* (2018.02); *H04L 65/1016* (2013.01); *H04W 84/12* (2013.01)

(58) Field of Classification Search
CPC ..... H04W 12/02; H04W 12/04; H04W 72/04; H04B 7/022; H04L 9/14; H04L 9/0806; H04L 67/104; H04L 67/1061
See application file for complete search history.

(56) References Cited

U.S. PATENT DOCUMENTS

| | | | |
|---|---|---|---|
| 2010/0302958 A1* | 12/2010 | Wietfeldt | H04W 76/025 370/252 |
| 2011/0306318 A1 | 12/2011 | Rodgers et al. | |
| 2012/0093098 A1* | 4/2012 | Charbit | H04W 72/04 370/329 |
| 2012/0163235 A1* | 6/2012 | Ho | H04W 76/023 370/254 |
| 2013/0205390 A1 | 8/2013 | Hauck et al. | |
| 2014/0315562 A1 | 10/2014 | Lim et al. | |
| 2014/0362728 A1 | 12/2014 | Krochmal et al. | |
| 2015/0350332 A1 | 12/2015 | Rauenbuehler et al. | |
| 2016/0073286 A1 | 3/2016 | Wang et al. | |
| 2016/0212682 A1 | 7/2016 | Chung et al. | |
| 2016/0337889 A1 | 11/2016 | Jung et al. | |

FOREIGN PATENT DOCUMENTS

| | | |
|---|---|---|
| WO | 2015026200 A1 | 2/2015 |
| WO | 2015115822 A1 | 8/2015 |

OTHER PUBLICATIONS

3GPP: GSG CN: Organization of subscriber data (Release 13), 3GPP TS 23.008 V13.2.0; Sep. 23, 2015, 122 pages.
Universal Mobile Telecommunications System {UMTS), 3G Security, Security Architecture {3GPP TS 33.102 version 3.6.0 Release 1999); Technical Specification, European Telecommunications Standards Institute 2000 {ETSI); Oct. 2000, 64 pages.
3rd Generation Partnership Project, TS 22.278, Technical Specification Group Services and System Aspects, Service Requirements for the Evolved Packet System (EPS) (Release 13); Technical Specification; 3rd Generation Partnership Project (3GPP); Dec. 2014; 46 pages.
Universal Mobile Telecommunications System (UMTS), 3G Security, Specification of the MILENAGE algorithm set: 1/n example algorithm set for the 3GPP authentication and key generation functions f1, f1 *, f2, f3, f4, f5 and f5*, Document 1: General (3GPP TS 35.205 version 7.0.0 Release 7); Technical Specification; ETSI 3rd Generation Partnership Project (3GPP); Jun. 2007; 17 pages.
Universal Mobile Telecommunications System (UMTS), 3G Security, Security Architecture (3GPP TS 33.102 version 3.6.0 Release 1999); Technical Specification, European Telecommunications Standards Institute 2000 (ETSI); 64 pgs.
3rd Generation Partnership Project, TS 22.278, Technical Specification Group Services and System Aspects, Service Requirements for the Evolved Packet System (EPS) (Release 13); Technical Specification; 3rd Generation Partnership Project (3GPP); 2014; 46 pgs.
3rd Generation Partnership Project, Technical Specification Group Services and System Aspects, 3GPP TS 33.401 System Architecture Evolution (SAE), Security architecture, (Release 13); Technical Specification; 3rd Generation Partnership Project (3GPP); Sep. 2015; 131 pgs.
Universal Mobile Telecommunications System (UMTS), 3G Security, Specification of the MILENAGE algorithm set: An example algorithm set for the 3GPP authentication and key generation functions f1, f1*, f2, f3, f4, f5 and f5*, Document 1: General (3GPP TS 35.205 version 7.0.0 Release 7); Technical Specification; ETSI 3rd Generation Partnership Project (3GPP); 2007; 17 pgs.

* cited by examiner

VOICE AND DATA CONTINUITY BETWEEN WIRELESS DEVICES

RELATED APPLICATIONS

This application claims benefit of U.S. Provisional Patent Application No. 62/235,512 entitled "Voice and Data Continuity Between Wireless Devices," filed on Sep. 30, 2015, which is incorporated by reference herein.

FIELD

The described embodiments relate generally to wireless communications using electronic devices, including systems and techniques for maintaining data continuity while using a direct connection at a wireless device or a relayed connection to the wireless device via another wireless device.

BACKGROUND

Recent technological advances have led to situations where a user has multiple different active wireless devices available for communication, often at the same general location and at the same time. In addition to a smart phone ("companion wireless device"), a user may also simultaneously have a headset, a tablet device, a laptop computer, a desktop computer, a portable media player, and/or one or more other wireless devices ("accessory wireless devices"), each of which may be able to conduct wireless communications using one or more different radio access technologies (RATs). The accessory wireless devices and the smartphone can be associated with a common account, and the user can originate outgoing communication sessions or receive incoming communication sessions using one or more of the wireless devices.

SUMMARY

Representative embodiments set forth herein disclose various systems and techniques for maintaining data session continuity between an accessory wireless device and a remote device while conserving the battery power of the accessory wireless device by relaying the data session through a companion wireless device as opportunity affords.

Wireless transmission functions may strain the battery capability of a given accessory wireless device. It is desirable to make use of the larger battery of the smart phone while enjoying the utility of the accessory wireless device. In view of the foregoing, there is a need to allow a user to commence and carry out a call or non-real-time service on an accessory wireless device and seamlessly offload radio transmission aspects to the smart phone or companion wireless device.

In some embodiments, an accessory wireless device such as a wearable computing device that includes wireless communication capabilities opportunistically conserves battery energy by offloading medium-to-long range wireless transmission and reception tasks (such as two-way communication with a cellular base station tower) to a second wireless device, for example, a smart phone or companion wireless device. The accessory wireless device may be operating an end-to-end application on a first stack, such as an Open Systems Interconnect (OSI) stack. This offloading results in the relaying of a data session from the accessory wireless device through the companion wireless device to a remote device that is terminating the end-to-end application. The application may be a voice call, text messaging application, a stream application or a web-browser session, for example. The remote device may be another cell phone, a land line phone, or a server provided by a subscription service such as a provider of streaming media. The user of the accessory wireless device will not want the application to be interrupted while the accessory wireless device is opportunistically relaying communications through the companion wireless device.

When the accessory wireless device powers up, or when the accessory wireless device reselects to a new base station in a cell phone network, the accessory wireless device will go through an authentication procedure during which it will generate, based on a Subscriber Key (K), various keys. The various keys include a Cipher Key (C Key), an Integrity Key (I Key), and security keys related to Radio Resource Control (RRC) and a Non-Access Stratum (NAS) layer. These security keys form a key hierarchy, with the Subscriber Key at the top. Subsequent to the authentication procedure, the accessory wireless device will obtain a Temporary Mobile Subscriber Identity (TMSI). After the authentication procedure, the accessory wireless device will establish the data session over a cellular connection with the remote device. In some embodiments, the data session is established over a Wireless Local Area Network connection to an access point.

When the accessory wireless device detects that it is proximate to a friendly companion wireless device, for example when the wearable computing device that includes wireless communication capabilities detects that it is proximate to a companion wireless device owned by the same party, the accessory wireless device pairs with the companion wireless device and establishes a local connection between the accessory wireless device and the companion wireless device. The accessory wireless device then pushes its wireless transport duties onto the companion wireless device. In other words, the accessory wireless device may then offload the medium-to-long range wireless tasks to the companion wireless device, thus conserving battery power at the accessory wireless device. In one embodiment, the accessory wireless device transmits to the companion wireless device selected security information that allows the companion wireless device to continue the wireless session with the base station or access point without establishing a new cellular or WLAN connection.

In some embodiments, the selected security information includes a TMSI, an I Key and/or a C Key. The companion wireless device receives the TMSI, the C Key and the I Key associated with the authentication procedure of the accessory wireless device and uses the TMSI, the C Key and the I Key to continue the data session with the base station.

In some embodiments, the companion wireless device receives first and second keys associated respectively with the RRC connection and the NAS connection of the accessory wireless device and uses the first and second keys to communicate with the serving network and thereby continue the data session.

In an alternative method of maintaining call continuity, an Internet Multimedia Subsystem (IMS) server is used to set up a multicall. By means of the multicall, the accessory wireless device and the companion wireless device are simultaneously connected at the application layer to the remote device. After the multicall is established, the accessory wireless device drops its medium-to-long range wireless connection to the base station or access point and maintains connectivity to the remote device through a local connection to the companion wireless device.

While the data session is being relayed through the companion wireless device, the accessory wireless device and/or the companion wireless device monitor the quality of the communication via the local connection between the accessory wireless device and the companion wireless device. For example, the devices may collect samples of number of bits in error, number of packets successfully sent, or signal strength samples (RSSI). Based on a moving average of these samples or a stable one pole infinite impulse response filter (a filter with a forgetting factor), the first or companion wireless device produces statistics such as bit error rate (BER), block error rate (BLER) and/or RSSI which reflect the quality of the local connection. When a statistic exceeds a threshold, e.g., a BER threshold, a BLER threshold, and/or an RSSI threshold (or falls below a threshold, e.g., for RSSI), the accessory wireless device and/or companion wireless device can take steps to tear down the relay and re-instate the medium-to-long-range link between the accessory wireless device and the base station or access point. Also, the first or companion wireless device may estimate a physical separation in terms of distance. For example, the companion wireless device or smart phone may send its latitude and longitude values to the accessory wireless device. The accessory wireless device may obtain its own position using a Global Positioning System (GPS) satellite service. Based on the two locations, the accessory wireless device can estimate the separation between devices.

When the quality of the local connection falls below a threshold or the distance becomes greater than some limit distance, the first and companion wireless device can tear down the local connection (or local link) and re-establish the medium-to-long range link. In one embodiment, the companion wireless device transmits to the accessory wireless device selected security information that allows the accessory wireless device to continue the wireless session with the base station or access point without the wireless accessory device needing to establish a new cellular or WLAN connection. In one embodiment, the accessory wireless device receives a TMSI, a C Key, and an I Key (associated with companion wireless device connections to a serving network) from the companion wireless device and uses the TMSI, the C Key and the I Key to continue the existing data session with the base station, thus maintaining call continuity with the remote device.

In other embodiments, the accessory wireless device receives first keys and second keys associated respectively with an RRC connection and an NAS connection of the companion wireless device and uses the first and second keys to communicate with the serving network and thus to continue with the data session. These first keys, in some embodiments, include a User Plane Integrity Key, a User Plane Encryption Key, an RRC Integrity Key and an RRC Encryption Key. The second keys, in some embodiments, include a NAS Encryption Key and an NAS Integrity Key.

A method of maintaining call continuity at a first wireless device, includes the first wireless device: i) receiving key data as a result of establishing an RRC connection to a base station of a wireless wide area network (WWAN), wherein the key data comprises a Cipher Key (CK), and an Integrity Key (IK); ii) receiving from the WWAN a TMSI; iii) generating a first key based on the CK, the IK, and a subscriber key (K); iv) generating a second key based on the CK, the IK, and the K; v) receiving, from the base station, first data encrypted based on the CK, wherein a portion of the first data is generated by a remote device; vi) detecting proximity to a second wireless device; vii) establishing a local connection to the second wireless device; viii) sending a signaling message to the second wireless device, wherein the signaling message comprises a request to receive subsequent data via the local connection; ix) sending key data to the second wireless device, wherein the key data is based on the CK; x) releasing the RRC connection; and xi) receiving, from the second wireless device, second data encrypted based on the CK via the local connection.

This application discloses a method of relaying data to a first wireless device from a second wireless device, the method including, at the second wireless device: i) receiving a signaling message from the first wireless device over a local connection, wherein the signaling message comprises: a) a request to receive data via the local connection, and b) a base station identifier identifying a base station of a WWAN; ii) receiving key data from the first wireless device, wherein the key data comprises a first key; iii) establishing, using the first key, a RRC connection with a base station identified by the base station identifier; iv) receiving, from the base station subsequent to the establishing, data originating from a remote device; and v) transmitting the data to the first wireless device via the local connection. In some embodiments, the method also includes: i) receiving a request from the first wireless device to establish the local connection; and ii) establishing the local connection with the first wireless device. In some embodiments, the method also includes receiving key data from the first wireless device, wherein the key data comprises a first key, a second key, an IK, and a CK. In some embodiments, the method also includes receiving a TMSI from the first wireless device. In some embodiments, the method also includes establishing, using the second key and the TMSI, a NAS connection to a Mobility Management Entity (MME) of the WWAN.

In addition, this application discloses a method of relaying data to a first wireless device from a second wireless device, the method including, at the second wireless device: i) establishing a local connection to the first wireless device; ii) receiving a signaling message from the first wireless device, wherein the signaling message comprises a request to receive data via the local connection and a base station identifier identifying a base station of a WWAN; iii) receiving key data from the first wireless device, wherein the key data comprises a first key, a second key, an IK, and a CK; iv) receiving a TMSI from the first wireless device; v) establishing, using the first key, an RRC connection with a base station identified by the base station identifier; vi) establishing, using the second key and the TMSI, a NAS connection to an MME of the WWAN; vii) receiving, from the base station, data from a remote device; and viii) transmitting the data to the first wireless device via the local connection.

This application also discloses a method of tearing down a relay of data via a second wireless device to a first wireless device, the method including, at the first wireless device: i) receiving first data originating from a remote device, wherein the first data is relayed by the second wireless device to the first wireless device over a local connection; ii) transmitting a signaling message to the second wireless device, wherein the signaling message comprises a request to receive subsequent data over a WWAN, wherein the second wireless device has an RRC connection to a base station of the WWAN; iii) receiving key data from the second wireless device, wherein the key data comprises a first key; iv) establishing, using the first key, an RRC connection to the base station; and v) receiving, subsequent to establishing the RRC connection and the NAS connection, second data originating from the remote device, wherein the second data is encrypted based on the CK. In some embodiments, the method includes detecting, prior to the transmitting a signaling message, that performance of the local connection is deteriorating. In some embodiments, the second wireless device has a NAS connection to an MME of the WWAN, and the method includes: i) receiving second key data from the second wireless device, wherein the second key data comprises a second key, an IK, and a CK; ii) receiving a TMSI from the second wireless device; and iii) establishing, using the second key and the TMSI, a NAS connection to the MME.

Also, this application discloses a method of tearing down a relay of data via a second wireless device to a first wireless device, the method including, at the first wireless device: i) receiving first data originating from a remote device, wherein the first data is relayed by the second wireless device to the first wireless device over a local connection; ii) detecting that performance of the local connection is deteriorating; iii) transmitting a signaling message to the second wireless device, wherein the signaling message comprises a request to receive subsequent data over a WWAN, wherein the second wireless device has a RRC connection to a base station of the WWAN and the second wireless device has a NAS connection to a MME of the WWAN; iv) receiving key data from the second wireless device, wherein the key data comprises a first key, a second key, an IK, and a CK; v) receiving a TMSI from the second wireless device; vi) establishing, using the first key, an RRC connection to the base station; vii) establishing, using the second key and the TMSI, a NAS connection to the MME; and viii) receiving, subsequent to establishing the RRC connection and the NAS connection, second data originating from the remote device, wherein the second data is encrypted based on the CK.

A method of maintaining call continuity at a first wireless device, is disclosed herein, including, at the first wireless device: i) receiving first data over a first link from a base station of a WWAN, wherein a portion of the first data is generated by a remote device; ii) detecting proximity to a second wireless device; iii) establishing a local connection to the second wireless device; iv) sending a signaling message to an Internet Multimedia Subsystem (IMS) server, wherein the first signaling message requests a conference call connection comprising the first link and a second link between the second wireless device and the base station; v) receiving second data from the remote device via the first link; vi) receiving third data from the remote device via the second link and the local connection; and vii) ceasing communications on the first link.

In addition, this application discloses a method of maintaining call continuity at a first wireless device, including, at the first wireless device: i) receiving first data from a base station of a WWAN, wherein a portion of the first data is generated by a remote device; ii) detecting proximity to a second wireless device; iii) establishing a local connection to the second wireless device; iv) sending a signaling message to an IMS server, wherein the signaling message requests a data flow rerouting, wherein the data flow rerouting switches a first link between the first wireless device and the base station with a second link between the second wireless device and the base station; v) receiving second data from the remote device via the first link before the data flow rerouting takes effect; and vi) receiving third data from the remote device via the local connection after the data flow rerouting takes effect.

An IMS method is provided herein for maintaining call continuity at a first wireless device, the method including, at a second wireless device: i) establishing a local connection to the first wireless device; ii) sending a signaling message to an IMS server, wherein the signaling message requests a data flow rerouting, wherein the data flow rerouting switches a first link between the first wireless device and the base station with a second link between the second wireless device and the base station; iii) receiving data from the remote device via the second link; and iv) relaying the data from the remote device to the first wireless device.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1A:
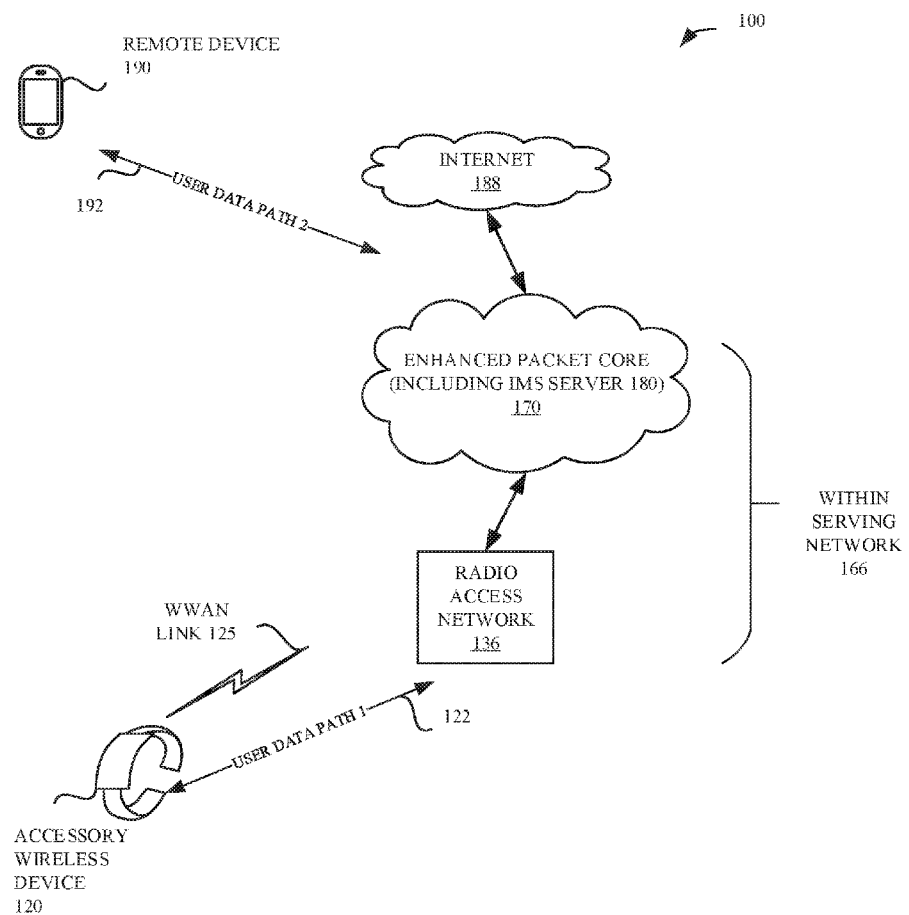
FIG. 1A is a diagram of an exemplary accessory wireless device communicating with a remote device via a WWAN, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

An accessory device may pair with a companion device in order to use the companion device to conserve the battery power of the accessory device. The companion device, such as a smart phone, maintains a voice call or data session with a remote device via a wireless connection to an eNodeB of a WWAN. This connection includes a Radio Resource Control (RRC) connection to the eNodeB and a Non-Access Stratum (NAS) connection to a Mobility Management Entity (MME) of the serving network. The call or session application, in some embodiments, is voice over LTE (VoLTE). The accessory device and the companion device communicate payload data using physical and medium access control layers provided by a WPAN (for example, Bluetooth) or a WLAN (for example, Wi-Fi). The accessory and companion devices perform ciphering and deciphering of the payload data.

In some embodiments, there may initially be no pairing, and the VoLTE call may be originated from the accessory wireless device to the WWAN. When the accessory wireless device comes within range of the companion wireless device, the accessory device detects the presence of the companion wireless device and the wireless devices pair using Wi-Fi or Bluetooth. This establishes a local wireless connection. The accessory wireless device then informs the companion wireless device of the ongoing VoLTE call.

The companion device then sends a link switch request message to an Internet Multimedia Subsystem (IMS) server, requesting that the server transfer the termination of the VoLTE call from the accessory device to the companion device. This request is sent to the IMS server using, for example, a Session Initiation Protocol (SIP) INVITE (or reinvite) message. The IMS server can then suspend the call with the accessory device and bring up a VoLTE link to the companion device to carry the VoLTE call. The IMS server then sends a link switch confirm message to the companion wireless device, for example as a SIP OK message. When the companion device receives the link switch confirm message, the companion wireless device instructs the accessory wireless device to disable its WWAN or other baseband stack. The companion wireless device then begins to relay payload data corresponding to the VoLTE call via the local connection.

In some embodiments, the accessory wireless device can send a multicall request to the IMS server, requesting the IMS server to add the companion device as an additional party to the session with the remote device. After the companion wireless device joins the multicall, the accessory wireless device drops its leg of the multicall but continues to terminate the end-to-end call from the remote device via the local connection with the companion wireless device.

As an alternative to bringing the companion wireless device into the role of a relay using IMS, the companion wireless device can directly take over the connection of the accessory wireless device to the serving network. The accessory wireless device sends selected NAS security context information and selected Access Stratum (AS) security context information to the companion wireless device. In some embodiments, the NAS security context information includes a NAS Encryption Key and a NAS Integrity Key. In some embodiments, the AS information includes a User Plane Integrity Key, a User Plane Encryption Key, an RRC Integrity Key and an RRC Encryption Key. More generally, if the companion wireless device supports an electronic Subscriber Identity Module (eSIM), the eSIM profile stored in the accessory device can be partially transferred to the companion wireless device and stored as an eSIM profile in an eSIM at the companion wireless device. eSIM, subscriber identity module (SIM) and profile terms are generally interchangeable. Generally, SIM may refer to a physical card (a type of secure element (SE)) whereas eSIM refers to applications and data that perform the functions of a SIM after being loaded onto an SE. Two examples of SEs are embedded universal integrated circuit cards (eUICCs) and universal integrated circuit cards (UICCs). The Subscriber Key, K, is stored within the SIM or eSIM.

The accessory wireless device then releases its RRC connection and the companion wireless device re-establishes the RRC connection and the NAS connection using the eSIM profile information obtained from the accessory wireless device. From the serving network's point of view, this appears as an RRC release and re-establishment by the same wireless device using the same eSIM profile.

Alternatively, if the companion wireless device does not have eSIM capability, the local connection can be used as a logical link between the eSIM of the accessory wireless device and the companion wireless device. The accessory wireless device can release its RRC connection and shut down all baseband activities with the exception of eSIM activities. The companion wireless device can then re-establish the RRC and NAS connections using the eSIM remotely in the accessory wireless device.

In some embodiments, the accessory wireless device may detect that it is becoming physically distant from the companion wireless device and that the local connection will not continue to be useful. The companion wireless device then can transfer current serving cell information, neighbor cell frequency information and identifiers, and corresponding system information blocks (SIBs) to the accessory wireless device via the local connection. This information can also include neighbor lists, serving cell and neighbor cell wireless frequencies, and neighbor cell identifiers. The accessory wireless device uses the information to fast camp on the serving cell and initiate an RRC connection. The connection from the accessory wireless device to the serving cell may be set up using any of the three approaches above: IMS link switch, IMS multicall, or use of eSIM information of the companion wireless device in an eSIM of the accessory wireless device.

For example, the accessory wireless device can send a link switch request message (IMS INVITE or REINVITE SIP message) to the IMS server. The IMS server then suspends the VoLTE call on the companion wireless device and sends a confirmation message (SIP OK message) to the accessory wireless device. The IMS server releases the VoLTE call with the companion wireless device and routes the VoLTE call to the accessory wireless device.

The data path can also be returned directly to the accessory wireless device rather than as a relay through the companion wireless device by using eSIM information. The companion wireless device can transfer a portion of its eSIM profile state to an eSIM in the accessory wireless device. The companion wireless device may support multiple eSIMs. Serving and neighbor cell information and SIB information are also transferred as when the relay is first established, but this time the information is flowing from the companion wireless device to the accessory wireless device. The information flowing to the accessory device can also include neighbor lists, serving cell and neighbor cell wireless frequencies, and serving cell and neighbor cell identifiers. The companion wireless device releases its RRC connection. The accessory wireless device then re-establishes the RRC connection using the eSIM information transferred from the companion wireless device.

In some embodiments, the companion wireless device establishes the relay using the eSIM information from the accessory wireless device. When the call is pulled back to the accessory wireless device, the companion wireless device releases the RRC connection originally established by the accessory wireless device. In one embodiment, the accessory wireless device reestablishes the RRC connection using the same eSIM information used to set up the relay. The sequence is as follows. The accessory wireless device first establishes the RRC connection; it then pairs with the companion wireless device, and it then provides selected eSIM information to be stored in an eSIM of the companion wireless device. The accessory wireless device then releases the RRC connection. The companion wireless device re-establishes the RRC connection. When the pairing becomes untenable (e.g., the devices are becoming physically distant), the companion wireless device releases the RRC connection after providing current network information to the accessory wireless device. The accessory wireless device then re-establishes the RRC connection using its own eSIM information and the current network information from the companion wireless device.

Particular aspects of the embodiments are now discussed with reference to the figures.

Relay Using IMS, Link Switch

FIG. 1A illustrates an example of a simplified communication system, according to some embodiments.

The exemplary system includes an accessory wireless device 120. In some embodiments, the accessory wireless device 120 is a wearable computing device that includes wireless communication capabilities. System 100 of FIG. 1A also illustrates a remote device 190 and a radio access network 136. Radio access network 136 forms a part of a WWAN. The accessory wireless device 120 communicates with the remote device 190 through the WWAN link 125 and a subsequent data path 192 to remote device 190. Accessory wireless device 120 executes a data session with remote device 190. The data path on WWAN link 125 is denoted user data path 1, identified as item 122 in FIG. 1A. The portion of the overall data path local to the remote device 190 is denoted User Data Path 2 and identified as item 192 in FIG. 1A. In some embodiments, the data session is an interactive voice session (a phone call), a delay-tolerant text session, a web-browser session, and/or a streaming session. The radio access network 136 is connected to an enhanced packet core 170 including an IMS server 180. These are part of a serving network 166. The serving network is connected to the Internet 188.

Figure 1B:
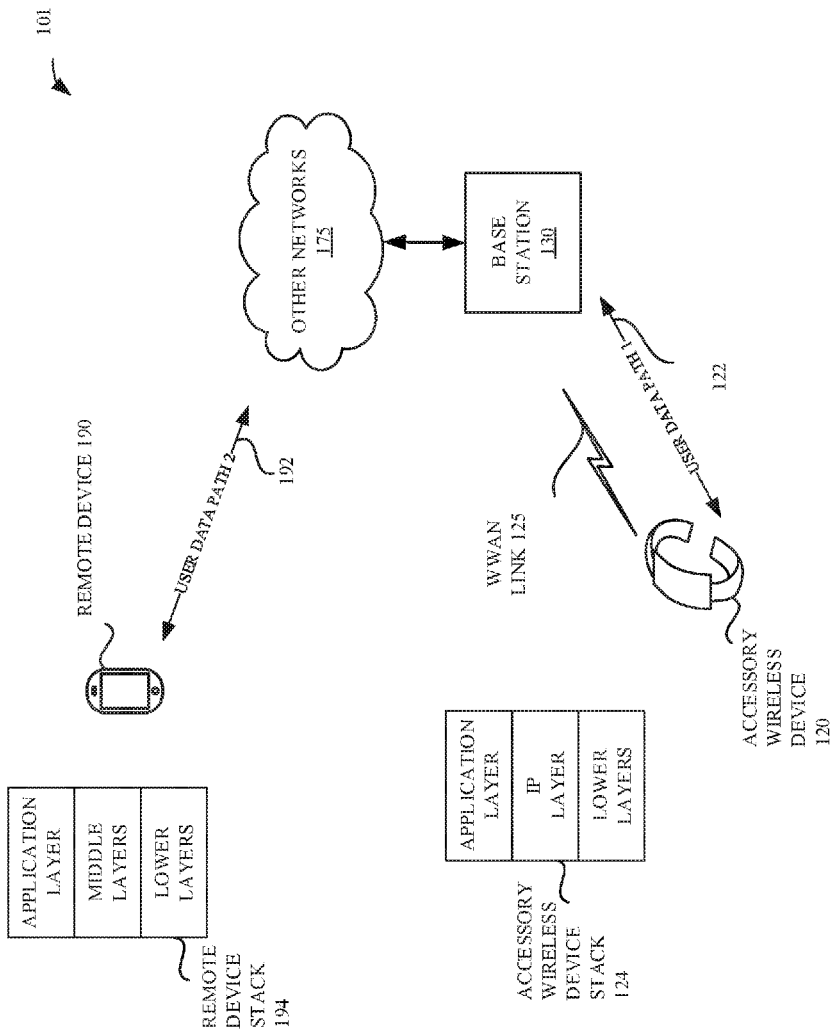
FIG. 1B illustrates exemplary views of the stacks used by the accessory wireless device and the remote device, according to some embodiments.

FIG. 1B, system 101, illustrates base station 130 which is part of the Radio Access Network 136 of FIG. 1A, according to some embodiments. The networks and network connections beyond the base station 130 are represented by Other Networks 175. The distance from accessory wireless device 120 to the base station 130 is typically between 10 meters and 1000 meters. FIG. 1B also illustrates simplified versions of the OSI layer diagram for accessory wireless device 120 and remote device 190, according to some embodiments. The former may communicate using stack 124 and the latter may communicate using stack 194. These two devices share application layer data. The user of accessory wireless device 120 is indifferent to the middle and lower layers of stack 124 and 194. In an exemplary embodiment, the lower layers of stack 124 implement a voice over Long Term Evolution (LTE) protocol (VoLTE). In an alternative embodiment, the lower layers of stack 124 implement a voice over internet protocol (VOIP) and one of several medium access control (MAC) and physical layer protocols. In some embodiments, the lower layers of stack 124 implement Wi-Fi. In the latter case, Base Station 130 represents a WLAN (Wireless Local Area Network) Access Point (AP). The distance between accessory wireless device 120 and a serving access point is between approximately a fraction of 1 meter and 30 meters. The distance between the accessory device 120 and the base station 130 is thus between 1 meter and 1000 meters depending on the technology in place and circumstances.

In some embodiments, the base station 130 of FIG. 1B is an evolved Node B ("eNodeB") of an LTE network. The base station 130 includes hardware that allows it to communicate with the accessory wireless device 120.

Figure 1C:
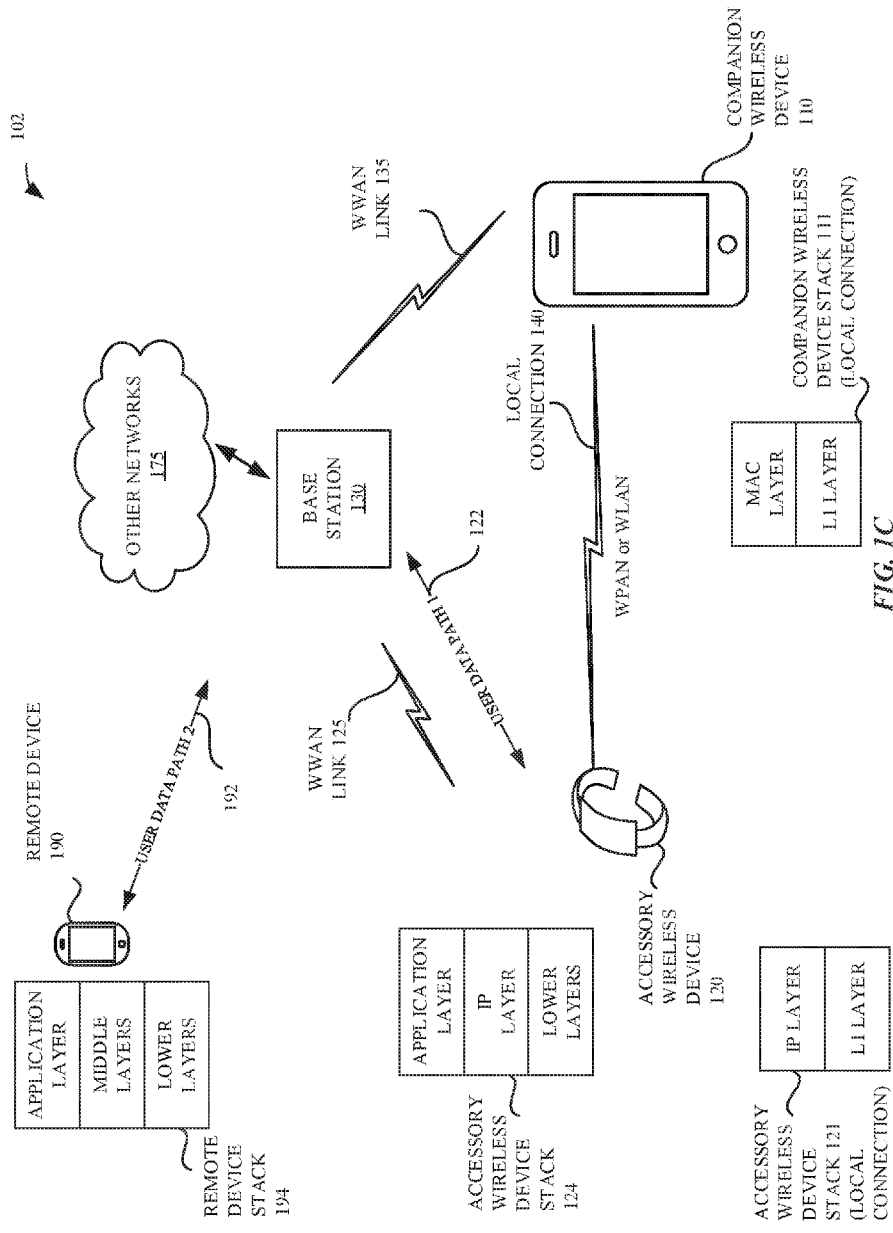
FIG. 1C illustrates an exemplary accessory wireless device establishing a local connection with a companion wireless device, according to some embodiments.

In some embodiments, the accessory wireless device 120 detects, at some point in time, the companion wireless device 110 as being physically near, such as within 20 centimeters or within 2 meters of the accessory wireless device 120 (see FIG. 1C, system 102). In some embodiments, accessory wireless device 120 and companion wireless device 110 are commonly owned and controlled. In some embodiments, in order to conserve battery power by making use of the functions of companion wireless device 110, accessory wireless device 120 requests establishment of a local connection 140 with companion wireless device 110. The distance spanned by the local connection is approximately 10 centimeters to 2 meters.

In some embodiments, the accessory wireless device 120 and the companion wireless device 110, participate in a handshake to authenticate. After an authentication which is mutually successful, a local connection 140 to companion wireless device 110 is established from accessory wireless device 120. In some embodiments, payload data passing along local connection 140 is encrypted with an encryption protocol with endpoints at companion wireless device 110 and accessory wireless device 120. In some embodiments, the lower layers of the local connection 140 are those of a Wireless Personal Area Network (for example, Bluetooth). In some embodiments, the lower layers are those of a WLAN (for example, Wi-Fi). The stack at accessory wireless device 120 for the local connection 140 is illustrated as stack 121. As the user application does not terminate at companion wireless device 110, stack 111 does not show an application layer. Accessory wireless device 120 may operate at least two stacks as shown in FIG. 1C, portions of which are shown as stack 124 and stack 121. Accessory wireless device 120 continues its session with remote device 190 (associated with the stack 124) while establishing local connection 140 with companion wireless device 110 (associated with the stack 121). The stack at companion wireless device 110 for the local connection 140 is shown as stack 111. Companion wireless device 110 may also have an existing wireless connection to the serving network 166. This connection is shown as WWAN link 135 in FIG. 1C.

Figure 1D:
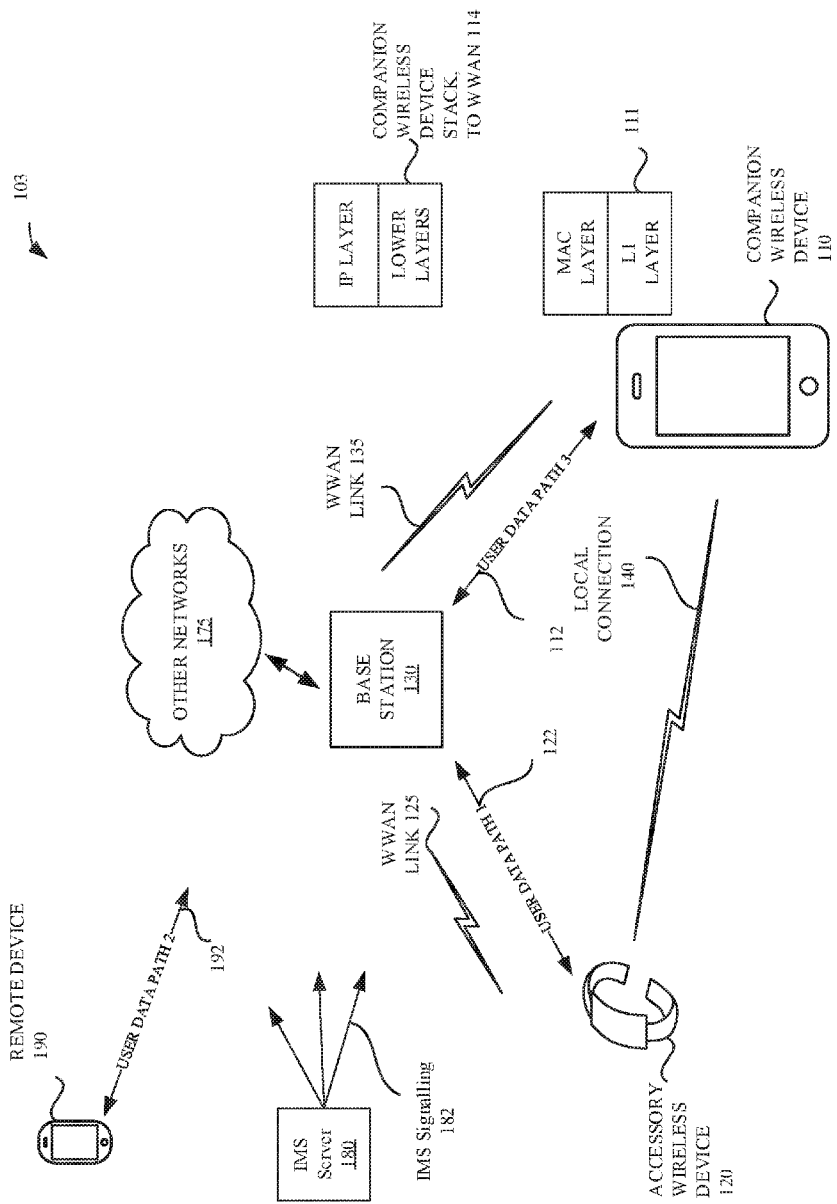
FIG. 1D illustrates an exemplary IMS Server interworking with the accessory wireless device and companion wireless device to establish a relay of user data, according to some embodiments.

In some embodiments, establishment of a data flow relay path from accessory wireless device 120 to remote device 190 through companion wireless device 110 is arranged by use of an IMS server 180 (see FIG. 1D, system 103). In some embodiments, to establish the data flow relay path, companion wireless device 110 initiates an Internet Engineering Task Force (IETF) Session Initiation Protocol (SIP) message through IMS Server 180 of FIG. 1D. In some embodiments, companion wireless device 110 initiates a SIP Link Switch. In some embodiments, accessory wireless device 120 sends a Session Initiation Protocol (SIP) INVITE message which identifies the companion wireless device 110, the accessory wireless device 120 and the remote device 190.

FIG. 1D illustrates data paths after the completion of the link switch, according to some embodiments. IMS Server 180 sends signaling messages 182 to remote device 190 to route data originating at remote device 190 through the serving network 166 to companion wireless device 110. The WWAN link 125 connection from base station 130 to accessory wireless device 120 is then dropped. In some embodiments, after completion of the link switch, IMS Server 180 sends Link Switch Confirm data to companion wireless device 110 in a SIP OK message.

Figure 1E:
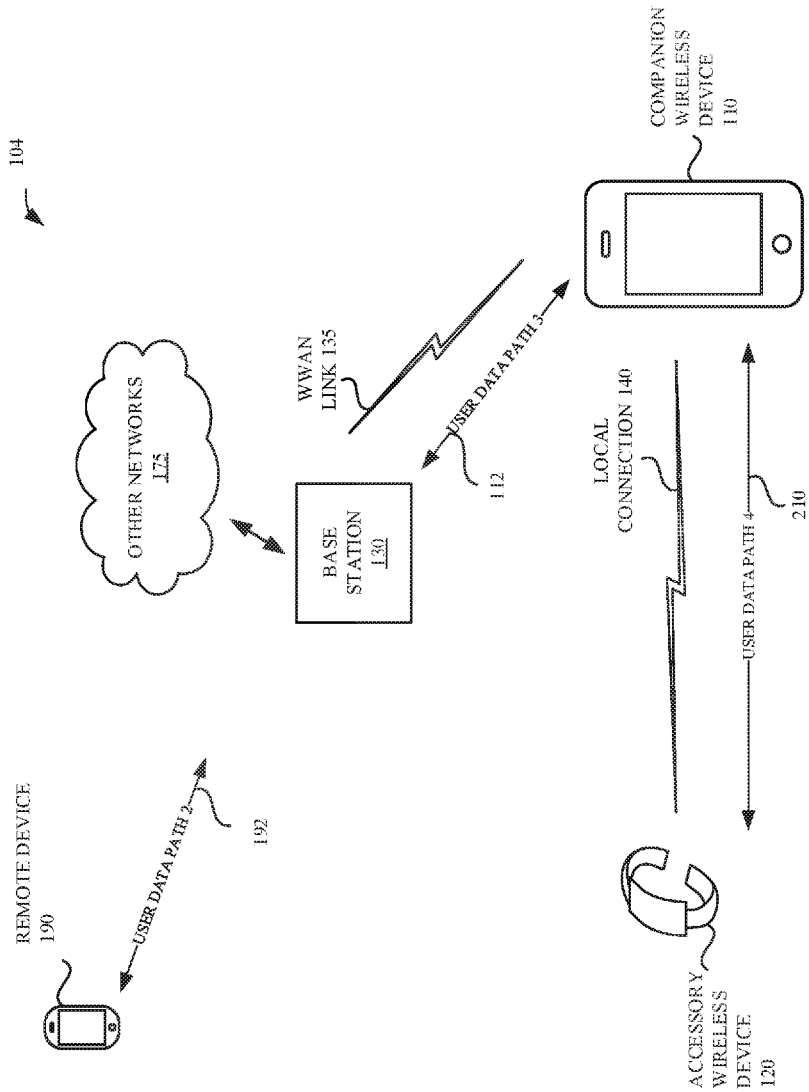
FIG. 1E illustrates exemplary user data being relayed through the companion wireless device, according to some embodiments.

FIG. 1E, system 104, illustrates completion of the relay of user data in which companion wireless device 110 routes user data to accessory wireless device 120 through the local connection 140 (denoted User Data Path 4), according to some embodiments. In the network configuration illustrated in FIG. 1E, accessory wireless device 120 is running, on stack 121 (see FIG. 1C), the application that communicates with remote device 190. Companion wireless device 110 is running two stacks: stack 114 associated with communication with base station 130 and stack 111 associated with communication with accessory wireless device 120 (see FIGS. 1C and 1D).

Relay Using IMS, Multicall

In some embodiments, the data flow relay path can be established by first creating a SIP Multicall (three-way conference call in this case). After the local connection 140 is in place as discussed above with regard to FIG. 1C, companion wireless device 110 receives a request from accessory wireless device 120 to perform as a relay. Companion wireless device 110 sends a SIP INVITE message to IMS server 180 asking for an IMS Multicall between remote device 190, accessory wireless device 120 and companion wireless device 110. In some embodiments this SIP INVITE message is sent over WWAN link 135 (see FIG. 1C). IMS server 180 communicates with remote device 190, accessory wireless device 120, and companion wireless device 110 and establishes the multicall. Initially, when the multicall is established, accessory wireless device 120 is receiving user data over WWAN link 125. Then, accessory wireless device 120 drops WWAN link 125, and companion wireless device 110 relays data from remote device 190 to accessory wireless device 120 on user data path 4 via local connection 140. This approach of establishing a multicall and then dropping the old WWAN link produces the same relay situation as that illustrated in FIG. 1E.

While user data is being relayed to accessory wireless device 120 through companion wireless device 110, radio channel conditions or other conditions can change. Accessory wireless device 120 and/or companion wireless device 110 can determine whether local connection 140 is sustainable. In some embodiments, this determination is performed based on received signal strength (RSSI) comparisons with an RSSI threshold, block error rate (BLER) comparisons with a BLER threshold, frame error rate, packet transmission success rate and a packet success rate threshold, or an estimate of distance between the accessory wireless device 120 and companion wireless device 110 based on location coordinates and comparison to a distance threshold. In embodiments, an RSSI threshold is −70 dBm; a BLER threshold is 10%; a packet success rate threshold is 80%, and a distance threshold is 2 m.

If the local connection is deemed unsustainable, re-establishment of a link from accessory wireless device 120 to base station 130 is needed to maintain call continuity. The following discussion refers to FIGS. 1D and 1E. In some embodiments, to tear down user data path 4 (210 of FIG. 1E), companion wireless device 110 sends one or more IMS signaling messages to the accessory wireless device 120 through IMS Server 180. In some embodiments, this is a SIP Link Switch in which the target is to re-establish WWAN link 125 from base station 130 to accessory wireless device 120. In some embodiments, an IMS signaling message (not shown) comprises a SIP INVITE message which identifies companion wireless device 110, accessory wireless device 120 and remote device 190. In some embodiments, IMS Server 180 then sends signals to remote device 190 to address user data to accessory wireless device 120. The WWAN link 135 to companion wireless device 110 is then dropped. In some embodiments, after completion of the link switch, IMS Server 180 sends Link Switch Confirm data to accessory wireless device 120 in a SIP OK message. At this point in time, accessory wireless device 120 is running two stacks: 121 and 124 (see FIG. 1C). Companion wireless device 110 is running two stacks: stack 111 and 114 (see FIG. D). In alternative embodiments, companion wireless device 110 shuts down stack 114. In some embodiments, the local connection 140 remains in place in the event that the tear down of the relay path was unnecessary. In some embodiments, when the local connection 140 is ultimately sustained, the relay path represented as user data path 4 (210 of FIG. 1E) is re-established.

In some embodiments, the relay path can be torn down by first creating a SIP Multicall. Companion wireless device 110 sends a SIP INVITE message to IMS server 180 asking for an IMS Multicall between remote device 190, accessory wireless device 120 and companion wireless device 110. IMS server 180 communicates with remote device 190, accessory wireless device 120 and companion wireless device 110 and establishes the call. Initially, when the multicall is established, accessory wireless device 120 is receiving user data over local connection 140. Then, companion wireless device 110 drops WWAN link 135 and accessory wireless device 120 receives user data from base station 130 without relay.

Security-Information-Based Relay

Figure 2:
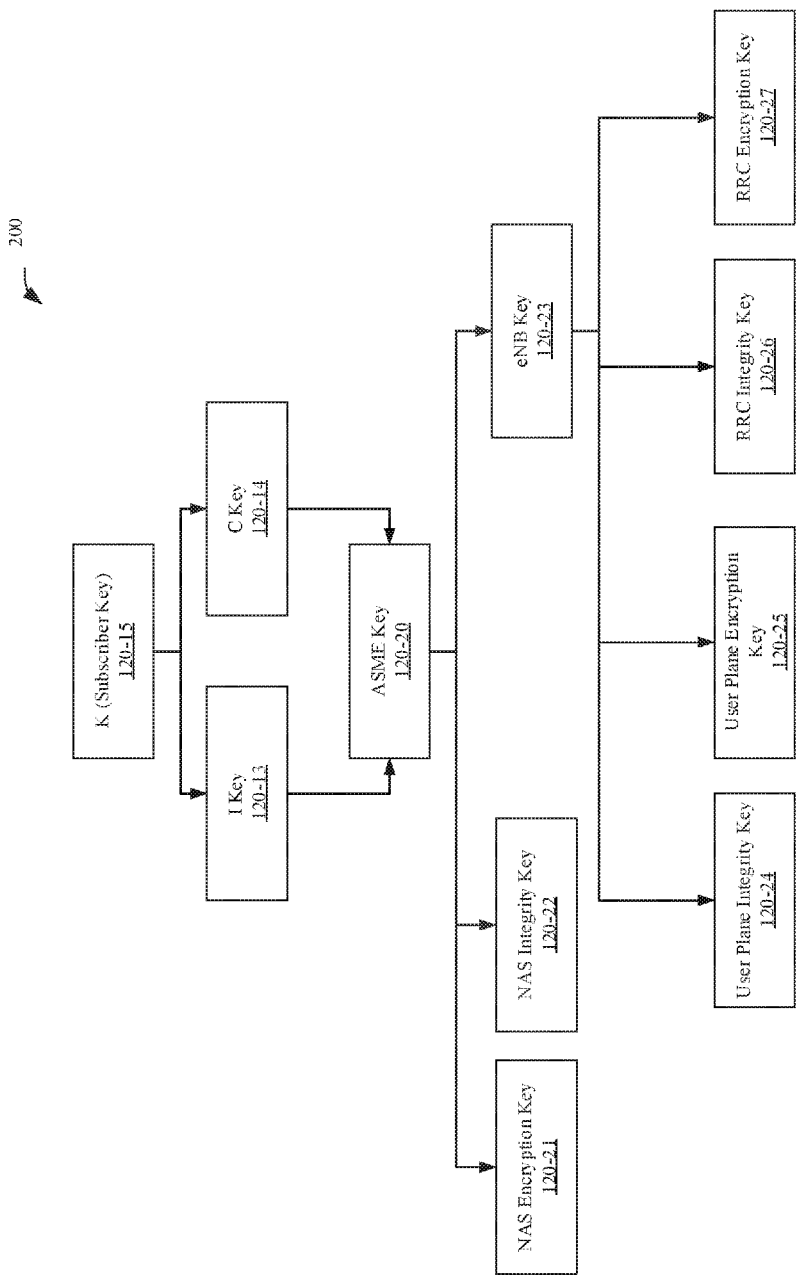
FIG. 2 illustrates an exemplary security key hierarchy associated with the accessory wireless device, according to some embodiments.
Figure 3A:
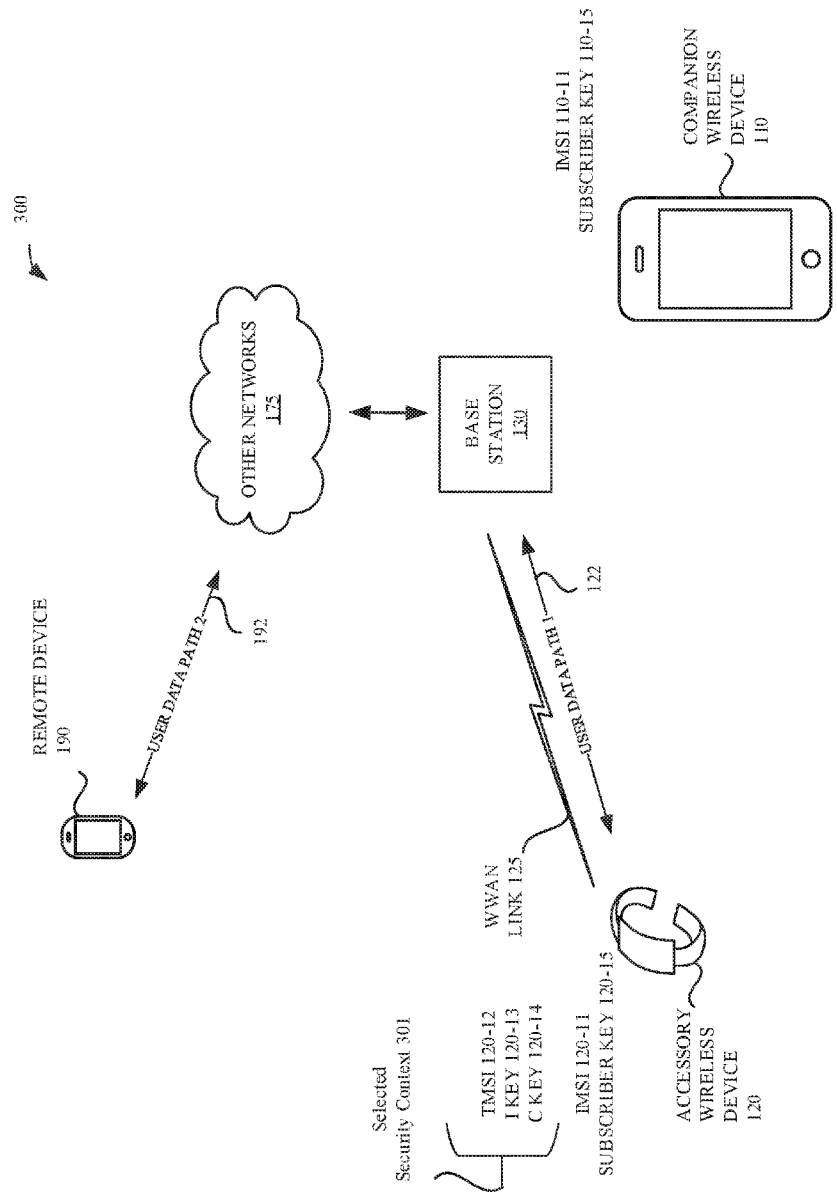
FIG. 3A illustrates an exemplary security context at the accessory wireless device after an authentication and key agreement procedure, according to some embodiments.

Confidentiality and authenticity of data transmissions by wireless devices in multiple access systems are achieved by means of encryption and authentication mechanisms. A key hierarchy is illustrated in FIG. 2, according to some embodiments. Before discussing the details of FIG. 2, a security context is introduced here. FIG. 3A, system 300, illustrates accessory wireless device 120 and a security context 301 associated with accessory wireless device 120, according to some embodiments. The security context 301 may comprise a Ciphering Key 120-14 (C Key or CK), an Integrity Key 120-13 (I Key or IK) and a Temporary Mobile Station Identifier (TMSI). A Subscriber Key 120-15 (K) may also be associated with accessory wireless device 120. The subscriber key 120-15 is stored in an eSIM resident on accessory wireless device 120 (e.g., the eSIM, in some embodiments, is present on an SE and the SE is housed in the accessory wireless device 120). In some embodiments, the C Key and I Key are computed by the eSIM during an authentication process with serving network 166. Examples of computation and use of a C Key and an I Key can be found in ETSI TS 135.205 v. 12.0.0 published October 2014 and entitled "Specification of the MILENAGE algorithm set: An example algorithm set for the 3GPP authentication and key generation functions f1, f1*, f2, f3, f4, f5 and f5*" (hereinafter "TS 135.205"), ETSI TS 133.102 v. 12.2.0 published January 2015 and entitled "Security architecture" (hereinafter "TS 133.102"), and 3GPP TS 33.401 v. 12.15.0 published September 2015 and entitled "Security Architecture" (hereinafter "TS 33.401").

eSIM data may originally be transferred to accessory wireless device 120 over a secure interface from a trusted service manager. The term "eSIM data" as used herein is refers to similar keys and security parameters as those keys and security parameters found in universal subscriber identity module (USIM) information. A USIM is a type of profile.

In some embodiments, during authentication, accessory wireless device 120 acquires an International Mobile Subscriber Identity 120-11 (IMSI) from an eSIM and uses the IMSI to identify itself to the serving network 166. The serving network, through an authentication center and the home network of accessory wireless device 120, obtains a C Key and an I Key and various authentication parameters. The key hierarchy illustrated in FIG. 2 is with respect to accessory wireless device 120, according to some embodiments. In some embodiments, a similar hierarchy pertains to companion wireless device 110, but with keys indexed to companion wireless device 110 rather than to the accessory wireless device 120.

At the top of the key hierarchy is K, also referred to herein as Subscriber Key 120-15. In some embodiments, the C Key 120-14 and I Key 120-13 are generated by the eSIM performing AKA based on the Subscriber Key 120-15, as illustrated in FIG. 2. An Access Security Management Entity (ASME) Key 120-20 is generated by the accessory wireless device 120 based on the C Key 120-14 and I Key 120-13. A NAS Encryption Key 120-21, a NAS Integrity Key 120-22, and an eNB Key 120-23 are generated by the accessory wireless device 120 based on the ASME Key 120-20. A User Plane Integrity Key 120-24 to be used with an integrity algorithm for the protection of user plane traffic, a User Plane Encryption Key 120-25 for the protection of user plane traffic with an encryption algorithm, an RRC Integrity Key 120-26 to be used with an integrity algorithm for the protection of RRC traffic and an RRC Encryption Key 120-27 for the protection of RRC traffic with an encryption algorithm are generated by the accessory wireless device 120 based on the eNB Key 120-23.

The home network of accessory wireless device 120 has access to a copy of Subscriber Key 120-15. Subscriber Key 120-15 is a secret that may be shared only between accessory wireless device 120 and its home network. Such a key is sometimes referred to as a shared secret. The serving network 166 completes authentication procedures with accessory wireless device 120, during which accessory wireless device 120 generates the C Key 120-14 and the I Key 120-13 based on information received during authentication and based on Subscriber Key 120-15. When the authentication is successful, accessory wireless device 120 and the serving network 166 are in agreement on the values of the I Key and the C Key. In some embodiments, this procedure is referred to as Authentication and Key Agreement (AKA). In some embodiments, after initiation of ciphering using the C Key, the accessory wireless device 120 is allocated a temporary mobile station identifier (TMSI) 120-12. For more details on the C Key, the I Key, AKA, IMSI and TMSI, please see TS 135.205, TS 133.102 and TS 33.401.

After authentication, a Radio Resource Control (RRC) state is established in base station 130 and accessory wireless device 120. RRC Integrity Key 120-26 and RRC Encryption Key 120-27 are associated with this state or RRC connection at base station 130. Also a Non-Access Stratum (NAS) state is established both in an MME associated with serving network 166 and is established in accessory wireless device 120. The NAS Encryption Key 120-21 and the NAS Integrity Key 120-22 are associated with the NAS state or NAS connection at the MME. The keys 120-26, 120-27, 120-21 and 120-22 are uniquely associated with the ongoing call or existing connection between the serving network and accessory wireless device 120.

FIG. 3A illustrates an initial connection of accessory wireless device 120 through base station 130 on WWAN link 125 and finally to remote device 190, according to some embodiments. User data between the two devices flows along user data path 1 and user data path 2. IMSI 120-11 and Subscriber Key 120-15 are stored in an eSIM residing in accessory wireless device 120. AKA has taken place with the serving network and accessory wireless device 120 has TMSI 120-12, I Key 120-13, and C Key 120-14. Keys 120-21, 120-22, 120-23, 120-24, 120-25, 120-26, and 120-27 are also stored in a memory of accessory wireless device 120. FIG. 3A also illustrates IMSI 110-11 and Subscriber Key 110-15 associated with companion wireless device 110; these are distinct from the IMSI 120-11 and Subscriber Key 120-15 associated with accessory wireless device 120. Similar to the discussion of FIG. 1C above, in some embodiments, accessory wireless device 120 requests establishment of a local connection 140 with companion wireless device 110. Unlike the foregoing embodiments, in an alternative embodiment described below, IMS signaling is not used to establish a relay of user data through companion wireless device 110.

Figure 3B:
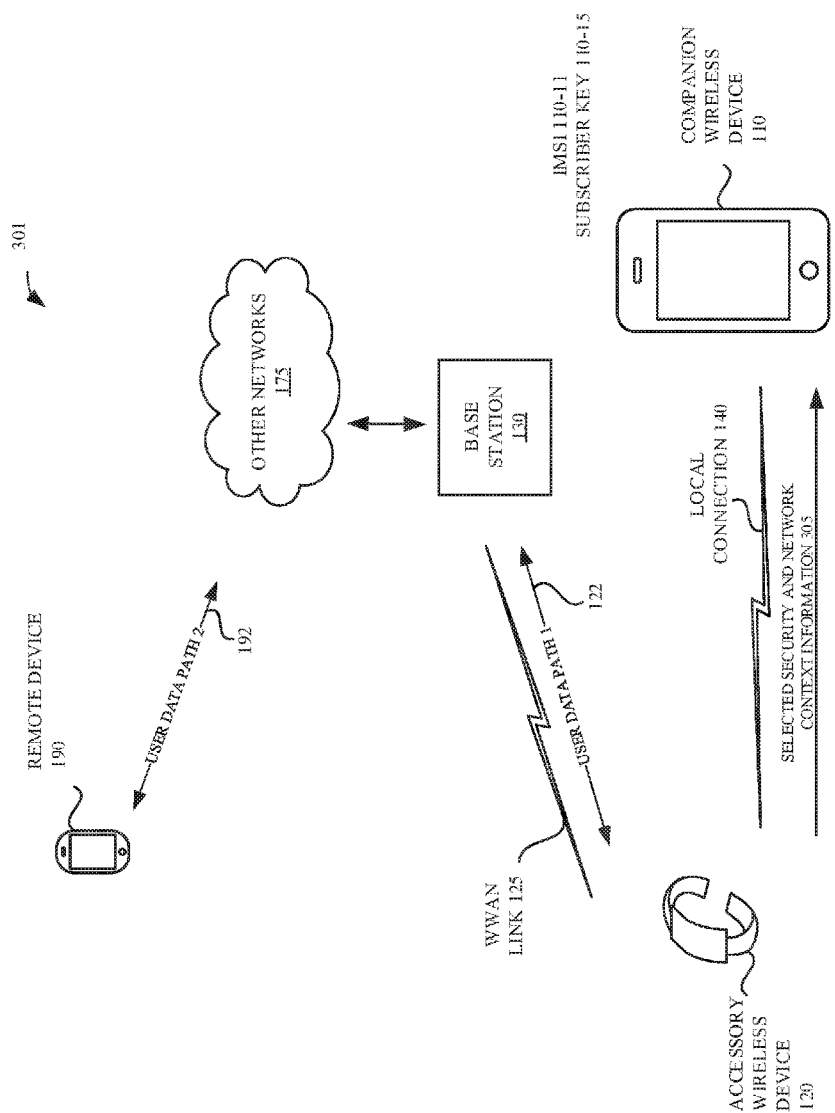
FIG. 3B illustrates an exemplary accessory wireless device sending selected information to the companion wireless device, according to some embodiments.
Figure 3C:
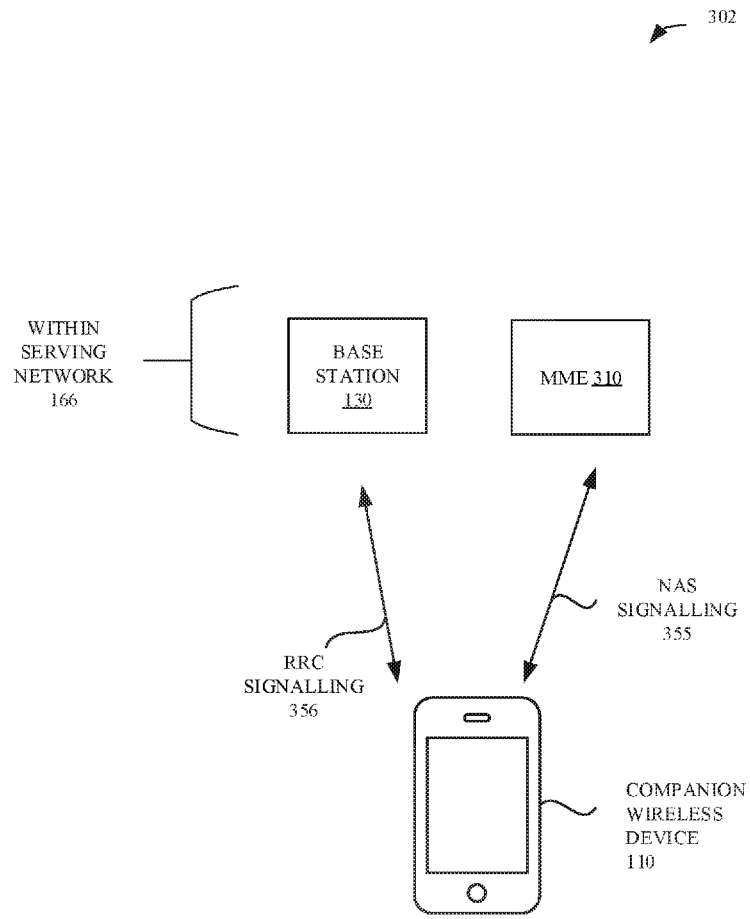
FIG. 3C illustrates an exemplary companion wireless device using the selected information to perform signaling, according to some embodiments.

Similar to previously described embodiments, accessory wireless device 120 may detect that it is in proximity to companion wireless device 110. These devices establish local connection 140 as shown in system 301 of FIG. 3B, according to some embodiments. In some embodiments, local connection 140 is encrypted. In order to maintain call continuity to remote device 190 and in anticipation of dropping the WWAN link 125, accessory wireless device 120 enables a rapid connection of companion wireless device 110 to base station 130. In other words, accessory wireless device 120 seeks to drop user data path 1 but maintain call continuity by means of local connection 140 and a user data path to be quickly set up by companion wireless device 110. In some embodiments, the new data path should be set up within 20 to 100 milliseconds (ms) after dropping WWAN link 125 (user data path 1). FIGS. 3A-3C illustrate how this quick setup is done, in some embodiments.

Rapid establishment of a data path from companion wireless device 110 to base station 130 can be achieved by re-using the existing WWAN connection context of accessory wireless device 120. FIG. 3B illustrates transmission of selected security information and selected network context information 305 from accessory wireless device 120 to companion wireless device 110, according to some embodiments. This information may be referred to as belonging to a key set, and the key set may be identified by a key set identifier (KSI). The selected security information, in some embodiments, includes TMSI 120-12, IMSI 120-11, I Key 120-13 and C Key 120-14. In some embodiments, the selected security information 305 includes NAS Encryption Key 120-21, NAS Integrity Key 120-22, User Plane Integrity Key 120-24, User Plane Encryption Key 120-25, RRC Integrity Key 120-26, and/or RRC Encryption Key 120-27 (not shown in FIG. 3B). In some embodiments, the selected security information includes a KSI (not shown). The selected network context information includes the identity of base station 130 with which accessory wireless device 120 is currently in communication. This selected network context information can also include neighbor lists, serving cell and neighbor cell wireless frequencies, and neighbor cell identifiers. The selected information also includes, in some embodiments, the security keys associated with the RRC connection at base station 130 (that is, eNB Key 120-23, User Plane Integrity Key 120-24, User Plane Encryption Key 120-25, RRC Integrity Key 120-26, and RRC Encryption Key) and the security keys associated with the NAS connection at the MME (that is, NAS Encryption Key 120-21, NAS Integrity Key 120-22). These security keys are associated with an AKA procedure previously executed by accessory wireless device 120. The network context information also includes, in some embodiments, parts of one or more recently acquired system information blocks (SIBs) including neighbor lists. This security information sharing between co-owned devices can be called a multi-eSIM activity or a multi-eSIM approach.

FIG. 3C, system 302, illustrates companion wireless device 110 temporarily taking on the WWAN call connection role of accessory wireless device 120, according to some embodiments. Accessory wireless device 120 may drop its RRC connection with base station 130 in the manner described below. Dropping the RRC connection can be achieved, in some embodiments, by the accessory wireless device 120 sending a message to base station 130. Companion wireless device 110 then re-establishes the same RRC connection using the security keys associated with the RRC connection at the serving base station (that is, RRC Integrity Key 120-26 and RRC Encryption Key 120-27). In some embodiments, companion wireless device 110 protects user plane traffic by applying User Plane Integrity Key 120-24, and User Plane Encryption Key 120-25. In some embodiments, the RRC connection can be re-established in a connected mode by the companion wireless device 110 sending a signaling message on a Random Access Channel (RACH) to base station 130. Signaling using RRC Integrity Key 120-26 and RRC Encryption Key 120-27 is indicated by 356 in FIG. 3C. Thus, companion wireless device 110 uses RRC Integrity Key 120-26 of the accessory wireless device 120 to confirm its knowledge of this key to Base Station 130. RRC Signalling 356 may also be based on TMSI 120-12. In some embodiments, companion wireless device communicates, in addition to or in the alternative with, MME 310 using the TMSI 120-12 and the security keys associated with the NAS connection (that is NAS Encryption Key 120-21 and NAS Integrity Key 120-22) between the serving network and the accessory wireless device 120. The NAS-related signaling is indicated by reference numeral 355 in FIG. 3C. Such NAS signaling by companion wireless device 110 using NAS Encryption Key 120-21 and NAS Integrity Key 120-22 of the accessory wireless device is performed, in some embodiments, to communicate a routing area update to serving network 166. Thus, WWAN link 135 is established between base station 130 and companion wireless device 110 (the same situation as illustrated in FIG. 1E). Associated with this link is user data path 3. With reference to FIG. 1C, the overall path is then completed by accessory wireless device 120 running its application layer over the protocol stack 121 on local connection 140 (local connection 140 is already in place). In other words, after establishment of WWAN link 135 (see FIG. 1C), user data flows between accessory wireless device 120 and remote device 190 via user data path 4, through companion wireless device 110 to user data path 3, then through base station 130 to possibly other networks (not shown) and finally through user data path 2 to remote device 190 (as in FIG. 1E). At this point in time, companion wireless device is running stacks 111 and 114 similar to the situation shown in FIG. 1D.

In some embodiments, companion wireless device 110 begins to act as a relay directly upon receiving the selected security and network context information 305 over local connection 140. That is, companion wireless device demodulates and decrypts signals intended for accessory wireless device 120 from base station 130 and forwards the resulting data over proximate link 140 to accessory wireless device 120. The decryption is done, in some embodiments, using User Plane Encryption Key 120-25 received from accessory wireless device 120 in Selected Information 305 (see FIGS. 2B and 3B). Companion wireless device 110 also encrypts and modulates data received over local connection 140 and sends the encrypted and modulated signals to base station 130 using the device identity of accessory wireless device 120. The encryption is done, in some embodiments, using User Plane Encryption Key 120-25 received from accessory wireless device 120 in selected security and network context information 305 (see FIG. 3B). Companion wireless device 110 and accessory wireless device 120 are co-owned, and this activity corresponds to a single ownership identity.

In some embodiments, companion wireless device 110 does not have a capability to receive and use security information such as that present in selected security and network context information 305. In this case, signaling to maintain the RRC and NAS connections originates and terminates at accessory wireless device 120. Accessory wireless device 120 uses local connection 140 to reach the transmitter and receiver of companion wireless device 110. Companion wireless device 110 uses the eSIM of accessory wireless device 120 through local connection 140. The data 305 of FIG. 3B is not sent, in some embodiments, to companion wireless device 110. Companion wireless device 110 begins to transmit and receive on behalf of accessory wireless device 120, effectively establishing WWAN link 135 and user data path 3 without RRC or NAS signaling to serving network 166.

Figure 4:
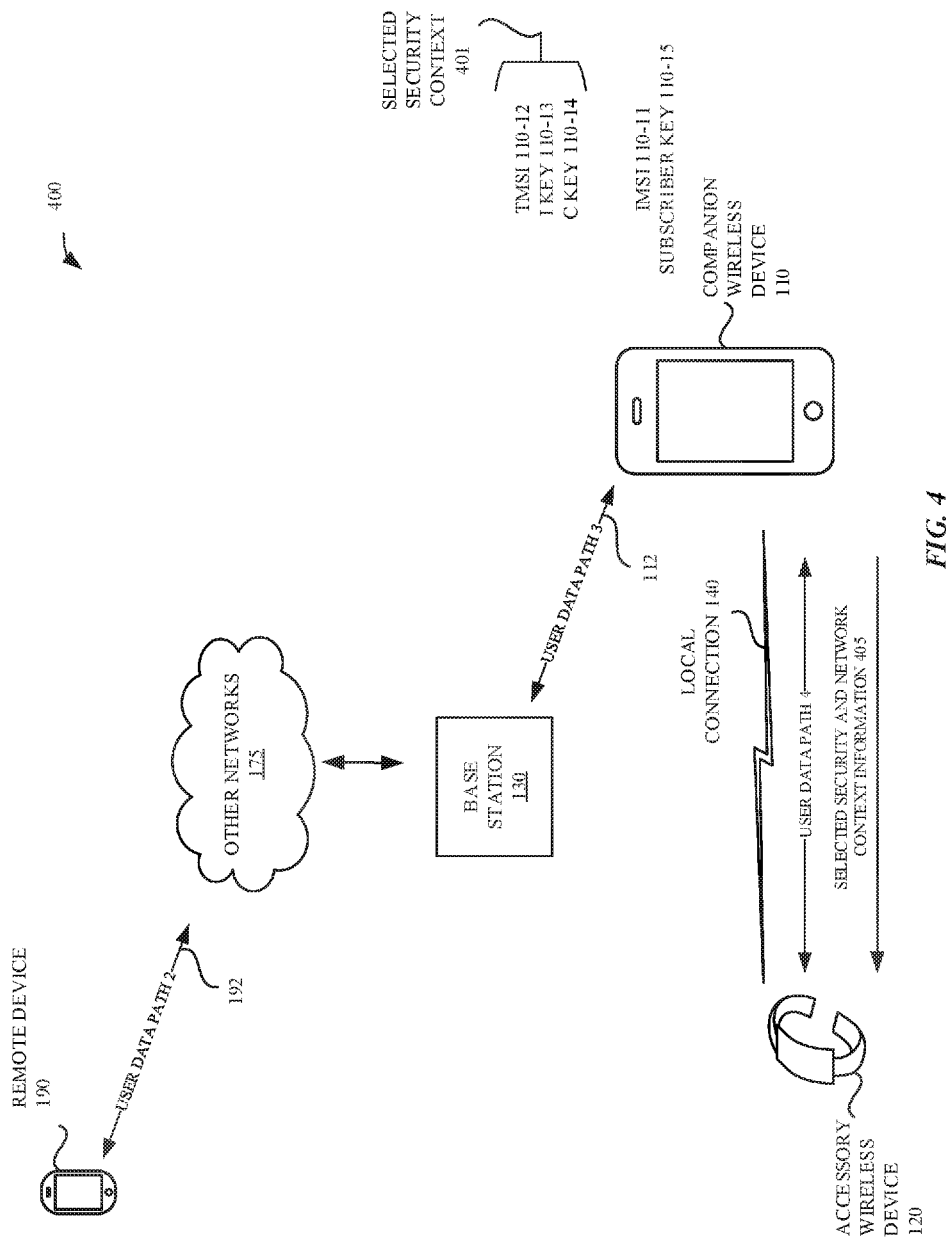
FIG. 4 illustrates an exemplary companion wireless device sending selected information to the accessory wireless device after the companion wireless device has performed an authentication and key agreement procedure, according to some embodiments.

In alternative embodiments, companion wireless device 110 is acting as a relay and using its own security context 401 as illustrated in FIG. 4. Companion wireless device 110 generates a key set using Subscriber Key 110-15 and a key hierarchy similar to that shown in FIG. 2 but for companion wireless device 110 (with "110" understood in place of "120" in FIG. 2). Thus, the companion wireless device has generated a NAS Encryption Key 110-21, a NAS Integrity Key 110-22, a User Plane Integrity Key 110-24, a User Plane Encryption Key 110-24, an RRC Integrity Key 110-26, and an RRC Encryption Key 110-27. In some embodiments, this security information at the companion wireless device 110 includes a companion KSI (not shown). The IMSI 110-11 and Subscriber Key 110-15 of companion wireless device 110 are stored in an eSIM associated with companion wireless device 110. It may be determined that local connection 140 of FIG. 4 is not sustainable as discussed above with regard to other embodiments. In this case, accessory wireless device 120 will pull the call back. That is, accessory wireless device 120 will re-establish direct wireless communication with base station 130 without the relay aspect of user data paths 3 and 4 through companion wireless device 110. In some embodiments, accessory wireless device 120 establishes a connection to base station 130 using an eSIM associated with companion wireless device 110 itself. The multi-eSIM approach for tear down of the local connection 140 while maintaining call continuity is illustrated in FIG. 4 and described below.

After it has been determined by accessory wireless device 120 or companion wireless device 110 that local connection 140 is not sustainable, a tear down of local connection 140 while maintaining call continuity begins. Companion wireless device 110 sends selected security and network context information 405 to accessory wireless device 120. The selected security information, in some embodiments, includes TMSI 110-12, IMSI 110-11, I Key 110-13 and C Key 110-14. In some embodiments, the selected information 405 includes one or more of NAS Encryption Key 110-21, NAS Integrity Key 110-22, User Plane Integrity Key 110-24, User Plane Encryption Key 110-25, RRC Integrity Key 110-26, or RRC Encryption Key 110-27 (not shown in FIG. 3B). In some embodiments, the selected security information includes a KSI associated with the security profile of the companion wireless device 110. The selected network context information includes the identity of base station 130 with which companion wireless device 110 is currently in communication. The selected information also includes, in some embodiments, the security keys associated with the RRC connection at base station 130 (that is, eNB Key 110-23, User Plane Integrity Key 110-24, User Plane Encryption Key 110-25, RRC Integrity Key 110-26, and RRC Encryption Key 110-27) and the security keys associated with a NAS connection at an MME (that is, NAS Encryption Key 110-21 and NAS Integrity Key 110-22). These two security keys are associated with an AKA procedure executed by companion wireless device 110. The network context information also includes, in some embodiments, parts of one or more recently acquired system information blocks (SIBs) including neighbor lists.

Figure 5:
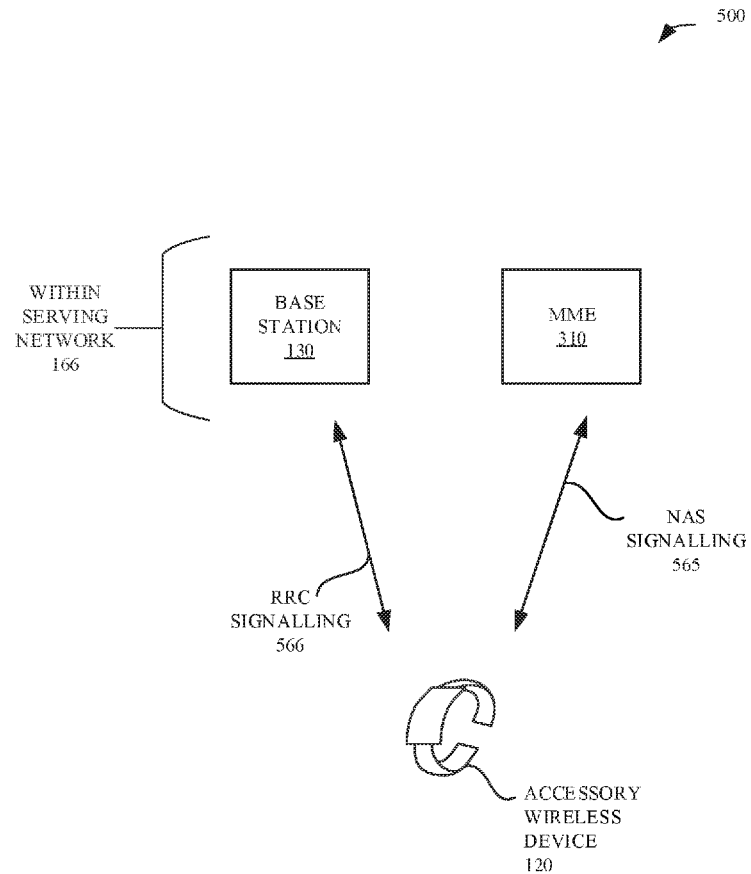
FIG. 5 illustrates an exemplary accessory wireless device performing signaling based on the selected information of FIG. 4, according to some embodiments.

FIG. 5 illustrates accessory wireless device 120 temporarily taking on the WWAN call connection role of companion wireless device 110, according to some embodiments. Companion wireless device 110 drops its RRC connection with base station 130. Accessory wireless device 120 then re-establishes the same RRC connection using the security keys associated with the RRC connection at the serving base station (that is, eNB Key 110-23, User Plane Integrity Key 110-24, User Plane Encryption Key 110-25, RRC Integrity Key 110-26, and RRC Encryption Key 110-27). This signaling is indicated by reference numeral 566 in FIG. 5. In some embodiments, accessory wireless device 120 communicates, in addition to or in the alternative with, MME 310 using the TMSI 110-12 and the security keys associated with the NAS connection between the serving network and companion wireless device 110 (that is, NAS Encryption Key 110-21 and NAS Integrity Key 110-22). The NAS-related signaling is indicated by reference numeral 565 in FIG. 5. Thus, WWAN link 125 is established between base station 130 and accessory wireless device 120. In some embodiments, accessory wireless device 110 decrypts received encrypted data using User Plane Encryption Key 110-5 of companion wireless device 110 and also encrypts user data using User Plane Encryption Key 110-5. Associated with this link is user data path 1. The overall path is then completed using stack 124 over user data path 1 (e.g., FIGS. 1C, 1D). In other words, after establishment of WWAN link 125, user data flows between accessory wireless device 120 and remote device 190 via user data path 1, through base station 130 to possibly other networks and finally over user data path 2 to remote device 190. At this point in time, companion wireless device is running stacks 111 and 114 similar to the situation shown in FIG. 1D. Accessory wireless device is up to running at least two stacks, stacks 121 and 124.

Figure 6:
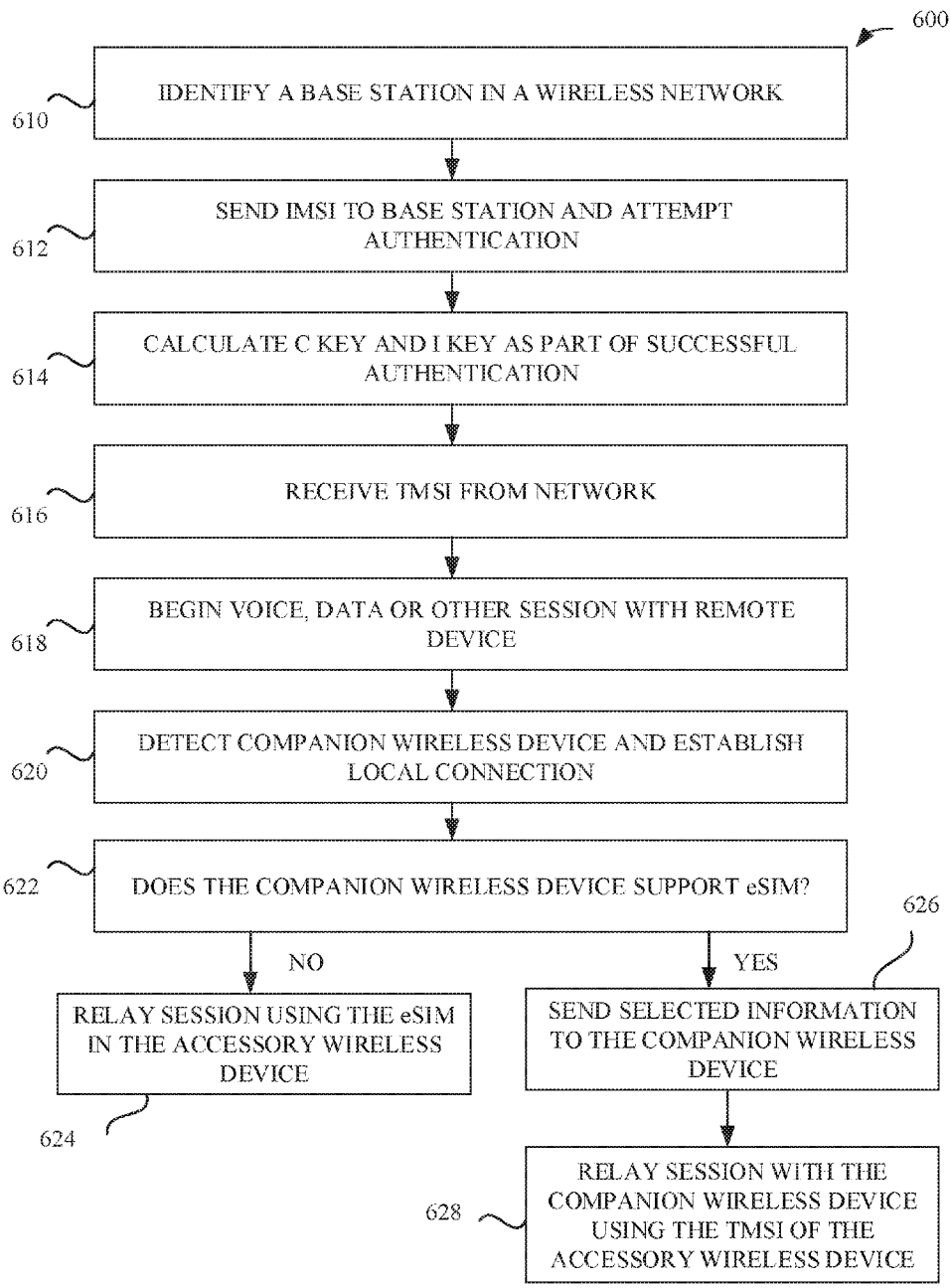
FIG. 6 is an exemplary flow chart illustrating a relay method involving the eSIM of the secondary device, according to some embodiments.

FIG. 6 illustrates exemplary logic related to establishing a relay connection using eSIM data of the accessory wireless device 120, according to some embodiments. At the beginning of the logical flow (610 of FIG. 6), the accessory wireless device identifies a base station in a wireless network. The accessory wireless device begins an authentication and key agreement (AKA) procedure at 612 by obtaining an International Mobile Station Identifier (IMSI) value from an eSIM associated with the accessory wireless device and sending the IMSI to the identified base station. After a successful AKA procedure, the accessory wireless device calculates at 614 a Cipher Key (C Key or CK) and an Integrity Key (I Key or IK) and continues communication with the network. After this, the network sends the accessory wireless device a Temporary Mobile Station Identifier (TMSI) which is received at 616. The accessory wireless device then begins a user data session with a remote device at 618. Next, the accessory wireless device detects at 620 that a companion wireless device is nearby. In some embodiments, the companion wireless device is owned by the same person owning the accessory wireless device. The accessory wireless device performs a handshake operation with the companion wireless device and obtains capability information about the companion wireless device (not shown). This capability information may be exchanged via the local connection or the accessory wireless device may consult a database reachable through the base station. The accessory wireless device then determines at 622 whether the companion wireless device has the hardware to support eSIM data sharing. If the companion wireless device does have such a capability, then, at 626, the accessory wireless device sends the companion wireless device selected information to allow the companion wireless device, shown as 628, to establish a relay path by communicating directly with the base station and serving network over the RRC and NAS connection established by the accessory wireless device. If the companion wireless device does not have eSIM sharing capability, then the accessory wireless device shuts down its baseband except for eSIM activity. At 624 the companion wireless device uses the eSIM of the accessory wireless device over the local connection to support RRC signaling and NAS signaling.

Figure 7:
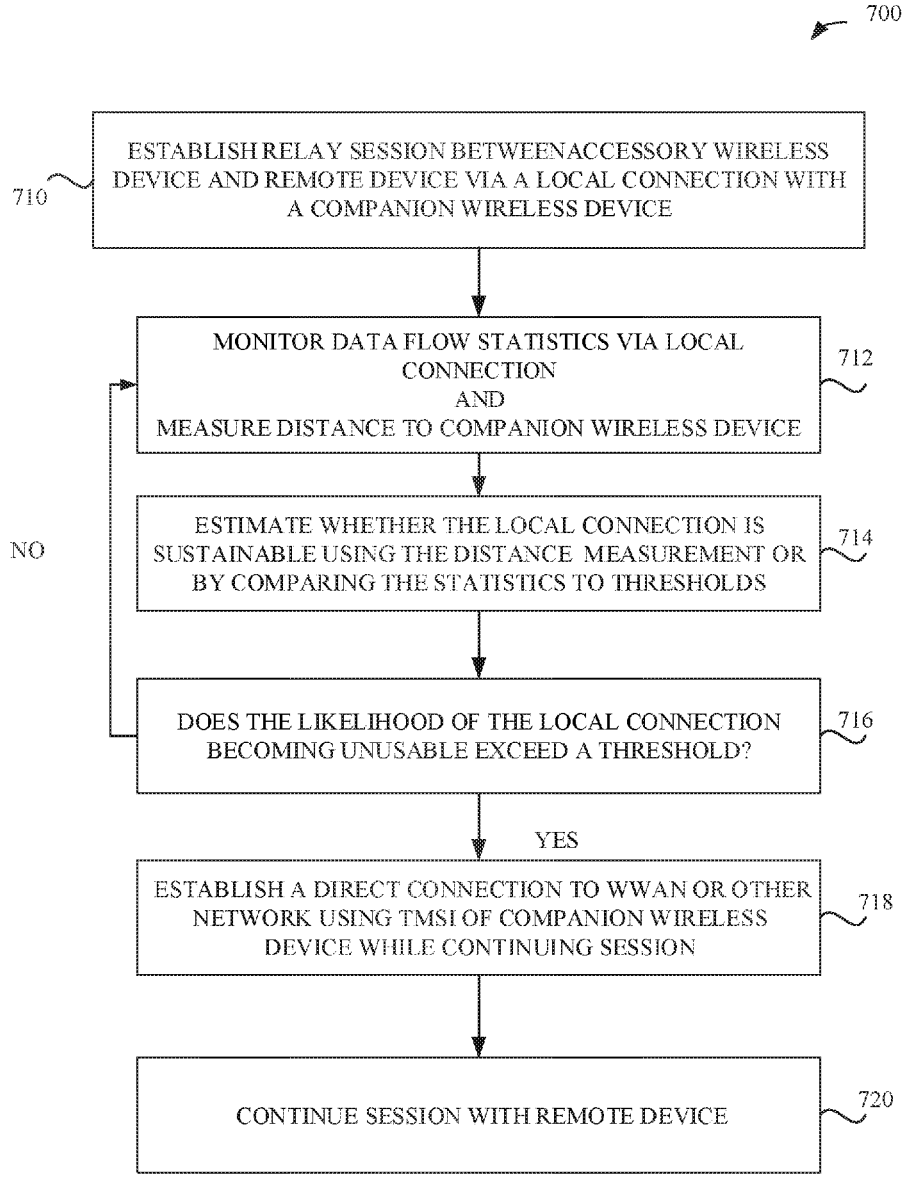
FIG. 7 is an exemplary flow chart illustrating a method of tearing down a local connection if necessary based on an estimate of the likelihood that the local connection is sustainable, according to some embodiments.

FIG. 7 provides exemplary logic for estimating whether the local connection 140 is sustainable over a short time period, for example, over the next 1-2 seconds, according to some embodiments. After the local connection is established at 710 of FIG. 7, the companion and accessory wireless devices collect samples at 712 to develop statistics and also measure the separation distance between themselves. These activities are done all at the accessory device in some embodiments. In some embodiments, these activities are all done at the companion device. In some embodiments, these activities are shared. Based on the statistics, which will be fresh if less than about 1-2 seconds old, the devices estimate every 1 second or so the likelihood that the local connection is sustainable for the next 1-2 seconds (see 714). The likelihood is evaluated at 716. If the likelihood of sustaining the connection falls below a threshold, for example, falls below 90%, then a tear-down procedure commences at 718 along with establishing a direct connection to a WWAN or WLAN by the accessory wireless device. Otherwise monitoring continues at 712. In this way call continuity is sustained while preserving the battery power of the accessory wireless device as much as possible by making use of the companion wireless device depending on circumstances at a given time.

Several relay establishment and tear-down embodiments have been described. Other embodiments may include a combination of features between the embodiments described above. For example, a serving network connection may commence with the accessory wireless device using IMSI 120-11 and a relay data path through companion wireless device 110 may be set up using IMS signaling and a SIP Multicall. The relay may subsequently be torn down while maintaining call continuity using the multi-eSIM approach in which accessory wireless device 120 uses selected security and network information 405 (ultimately based on IMSI 110-11) received from companion wireless device 110.

As another alternative, the relay may be established using the multi-eSIM approach of FIGS. 3A, 3B, and 3C and torn down using the SIP multicall approach discussed with reference to FIG. 1D. In this case, companion wireless device 110 would drop user data path 3 of the multi-call after user data flow along user data path 1 has commenced.

The method for estimating whether local connection 140 is sustainable using BER, packet success rate, RSSI, frame error rate or estimate of distance may be used in the various embodiments regardless of the mechanism for setting up the relay or the mechanism for tearing down the relay.

Local connection 140 may either be sustained or dropped after a user data flow over a relay connection is torn down. Companion wireless device 110 may or may not drop WWAN link 135 after ceasing to act as a relay for accessory wireless device 120.

Accessory wireless device 120 and companion wireless device may be running other stacks and wireless transceivers not otherwise discussed herein. For example, both may be operating Global Positioning System (GPS) or other location services which involve a receiver or transceiver aspect. GPS coordinates are used, in some embodiments, to estimate separation distance between the secondary and companion wireless devices and estimating, based on the estimated distance, whether local connection 140 is sustainable.

A relay connection may be established or torn down based on the instantaneous quality of service demands at accessory wireless device 120 or remote device 190. However, the embodiments are not limited to active user interaction at the application layer. A relay connection in some embodiments using the multi-eSIM approach is established or torn down while applications on the accessory wireless device are inactive.

Representative Exemplary Apparatus

Figure 8:
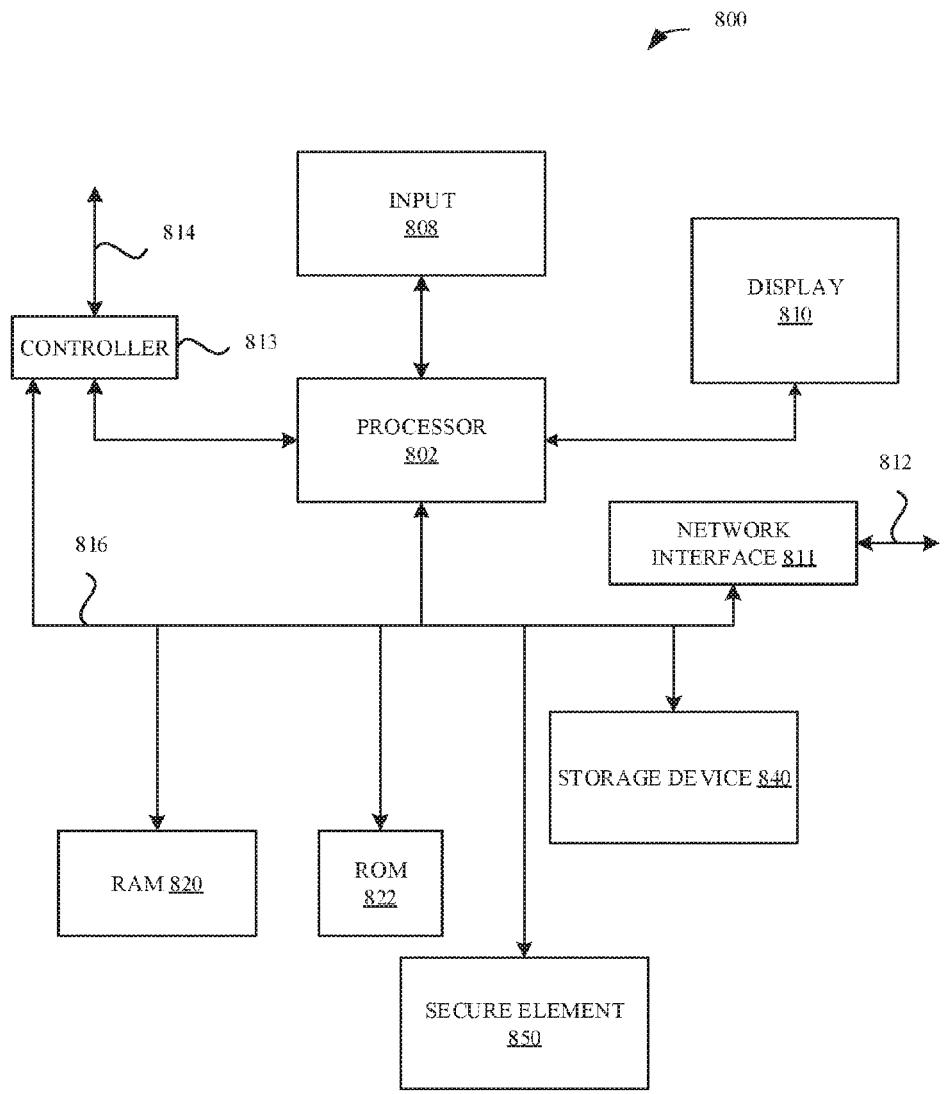
FIG. 8 is an exemplary computing apparatus that can be used to implement the various components and techniques described herein, according to some embodiments.

FIG. 8 illustrates in block diagram format an exemplary computing device 800 that can be used to implement the various components and techniques described herein, according to some embodiments. In particular, the detailed view of the exemplary computing device 800 illustrates various components that can be included in the wireless accessory device 120 and/or companion wireless device 110. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (screen display) that can be controlled by the processor 802 to display information to the user (for example, information relating to incoming, outgoing, or active communication session). A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include wireless circuitry, such as a wireless transceiver and/or baseband processor.

The computing device 800 also includes a storage device 840, which can comprise a single storage or a plurality of storages (e.g., hard drives), and includes a storage management module that manages one or more partitions within the storage device 840. In some embodiments, storage device 840 can include flash memory, semiconductor (solid state) memory or the like. The computing device 800 can also include a Random Access Memory ("RAM") 820 and a Read-Only Memory ("ROM") 822. The ROM 822 can store programs, utilities or processes to be executed in a non-volatile manner. The RAM 820 can provide volatile data storage, and stores instructions related to the operation of the computing device 800. The computing device 800 also includes a secure element (SE) 850. The SE 850 provides SIM and/or eSIM authentication and encryption operations.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of maintaining call continuity at a first wireless device, the method comprising:
　at the first wireless device:
　　establishing a radio resource control (RRC) connection to a base station of a wireless wide area network (WWAN);
　　receiving, from the base station, first data encrypted based on a Cipher Key (CK), wherein a portion of the first data is generated by a remote device;
　　establishing a local connection to a second wireless device;
　　sending a signaling message comprising key data to the second wireless device, wherein the key data is based on the CK; and
　　receiving, from the second wireless device, second data encrypted based on the CK via the local connection.

2. The method of claim 1, wherein the key data comprises one or more of a network access stratum (NAS) encryption key, a NAS integrity key, a user plane integrity key, a user plane encryption key, an RRC integrity key, or an RRC encryption key.

3. The method of claim 1, further comprising:
releasing, subsequent to sending the signaling message to the second wireless device, the RRC connection to the base station.

4. The method of claim 1, further comprising:
receiving, from the base station, a temporary mobile station identifier (TMSI).

5. The method of claim 4, further comprising:
using a secure element, included in the first wireless device, to obtain a first key based on the CK, an integrity key (IK), and a subscriber key (K); and
using the secure element to obtain a second key based on the CK, the IK, and the K.

6. The method of claim 5, wherein the signaling message further comprises the IK, the first key, the second key, and the TMSI.

7. The method of claim 6, wherein: i) the first key comprises a radio resource control (RRC) encryption key, and ii) the second key comprises a network access stratum (NAS) encryption key.

8. A wireless device comprising:
a memory;
one or more processors; and
a secure element,
wherein the memory includes instructions that when executed by a processor of the one or more processors, cause the wireless device to perform operations comprising:
establishing a radio resource control (RRC) connection to a base station of a wireless wide area network (WWAN);
receiving, from the base station, first data encrypted based on a Cipher Key (CK), wherein a portion of the first data is generated by a remote device;
establishing a local connection to a second wireless device;
sending a signaling message comprising key data to the second wireless device, wherein the key data is based on the CK; and
receiving, from the second wireless device, second data encrypted based on the CK via the local connection.

9. The wireless device of claim 8, wherein the key data comprises one or more of a network access stratum (NAS) encryption key, a NAS integrity key, a user plane integrity key, a user plane encryption key, an RRC integrity key, or an RRC encryption key.

10. The wireless device of claim 8, further comprising:
releasing, subsequent to sending the signaling message to the second wireless device, the RRC connection to the base station.

11. The wireless device of claim 8, further comprising:
receiving, from the base station, a temporary mobile station identifier (TMSI).

12. The wireless device of claim 11, further comprising:
using the secure element to obtain a first key based on the CK, an integrity key (IK), and a subscriber key (K); and
using the secure element to obtain a second key based on the CK, the IK, and the K.

13. The wireless device of claim 12, wherein the signaling message further comprises the IK, the first key, the second key, and the TMSI.

14. The wireless device of claim 13, wherein: i) the first key comprises a radio resource control (RRC) encryption key, and ii) the second key comprises a network access stratum (NAS) encryption key.

15. A non-transitory computer readable medium comprising instructions that when executed by a processor of a wireless device, cause the wireless device to perform operations comprising:
establishing a radio resource control (RRC) connection to a base station of a wireless wide area network (WWAN);
receiving, from the base station, first data encrypted based on a Cipher Key (CK), wherein a portion of the first data is generated by a remote device;
establishing a local connection to a second wireless device;
sending a signaling message comprising key data to the second wireless device, wherein the key data is based on the CK; and
receiving, from the second wireless device, second data encrypted based on the CK via the local connection.

16. The non-transitory computer readable medium of claim 15, wherein the key data comprises one or more of a network access stratum (NAS) encryption key, a NAS integrity key, a user plane integrity key, a user plane encryption key, an RRC integrity key, or an RRC encryption key.

17. The non-transitory computer readable medium of claim 15, wherein the operations further comprise:
releasing, subsequent to sending the signaling message to the second wireless device, the RRC connection to the base station.

18. The non-transitory computer readable medium of claim 15, wherein the operations further comprise:
receiving, from the base station, a temporary mobile station identifier (TMSI).

19. The non-transitory computer readable medium of claim 18, wherein the operations further comprise:
using the secure element to obtain a first key based on the CK, an integrity key (IK), and a subscriber key (K); and
using the secure element to obtain a second key based on the CK, the IK, and the K.

20. The non-transitory computer readable medium of claim 19, wherein the signaling message further comprises the IK, the first key, the second key, and the TMSI.

* * * * *